United States Patent [19]

Muir

[11] 4,395,341
[45] Jul. 26, 1983

[54] USE OF METRONIDAZOLE IN OIL RECOVERY

[75] Inventor: Robert D. Muir, Glenview, Ill.

[73] Assignee: G. D. Searle & Co., Skokie, Ill.

[21] Appl. No.: 300,092

[22] Filed: Sep. 8, 1981

Related U.S. Application Data

[63] Continuation of Ser. No. 814,969, Jul. 21, 1977, abandoned.

[51] Int. Cl.³ ............................................. E21B 43/22
[52] U.S. Cl. ................................. 252/8.55 D; 166/275
[58] Field of Search ................... 252/8.55 D; 424/273

[56] References Cited

U.S. PATENT DOCUMENTS

| | | | |
|---|---|---|---|
| 2,839,467 | 6/1958 | Hutchison et al. | 252/8.55 D |
| 3,087,891 | 4/1963 | Hodge | 252/8.55 D |
| 3,329,610 | 7/1967 | Kruez et al. | 252/8.55 D |
| 4,031,232 | 6/1977 | Winkelmann et al. | 424/273 R |
| 4,041,168 | 8/1977 | Assandri et al. | 424/273 R |

OTHER PUBLICATIONS

*The Merck Index*, Metronidazole, 9th Edition, p. 803, 1976.

*Primary Examiner*—Herbert B. Guynn
*Attorney, Agent, or Firm*—Albert Tockman

[57] ABSTRACT

The invention relates to the use of metronidazole as an improved bactericidal agent in flooding waters used in oil recovery operations.

5 Claims, No Drawings

USE OF METRONIDAZOLE IN OIL RECOVERY

This is a continuation, of application Ser. No. 814,969, filed July 21, 1977, now abandoned.

The present invention relates to the use of metronidazole as an improved bactericidal agent in flooding waters used in oil recovery operations.

A major cause of reduction in the recovery of crude oil from wells is the clogging of the oil-bearing strata and recovery equipment by the growth of microorganisms. This clogging reduces the flow of oil during the primary stages of recovery and necessitates the costly measures which are employed in secondary recovery. The process continues during secondary recovery and many oil companies are now developing and using tertiary recovery methods. It has been estimated that only 40% of the oil available in a given field can be obtained in the primary recovery stage. Thus, tremendous quantities of crude oil remain in fields within the United States.

Due to the environment in which they grow, most of the organisms responsible for clogging of the oil-bearing strata and recovery equipment are anaerobic bacteria, particularly *Desulfovibrio desulfuricans*. This organism is an obligate anaerobe and a chemoorganotroph which obtains energy by reducing sulfates or other sulfur compounds to $H_2S$. It is capable of growing at temperature from 0° C. to 40° C. It is used at the test organism by the American Petroleum Institute for evaluating chemicals for their antibacterial utility in drilling and recovery fluids.

*D. desulfuricans*, cause problems, also, in gas wells. The $H_2S$ formed by the organism contaminates the methane and must be removed at some expense.

Oil which remains in underground porous rock formations cannot be recovered by conventional oil pumping methods. In order to recover this residual oil, workers in this field have resorted to "secondary oil recovery" techniques. One well known "secondary oil recovery" process consists of forcing flood waters down one or more wells into the porous earth formation at high pressure. The water displaces the oil from the pores of the earth formation, and the oil is recovered at other wells located some distance from the side of the water injection well.

The commercial utilization of this technique has given rise to a most serious problem, which arises from the growth of aerobic and anaerobic bacteria in the injection water system. The bacteria multiply in such large numbers that they cause corrosion of the metal equipment, and in unchecked quantities they are capable of plugging the pores of the oil-bearing earth formation. The sulfate reducers, *Desulfovibrio desulfuricans*, cause corrosion of the metal equipment and cause plugging of the oil-bearing pores.

In an effort to kill these microorganisms various bactericides have been employed including quaternary ammonium compounds, formaldehyde, chlorinated phenols, hypochlorites, and chlorine. These bactericides have not been found completely suitable in this application for many reasons. For example, many of the bactericides are not compatible with other required chemical additives, e.g., corrosion inhibitors; others remain as residues in flood waters in sufficient concentrations to make the water toxic; others exhibit high corrosion on metallic equipment. However, one of the principal objections to most of these bacterides is that they permit the development of resistant strains of microorganisms. When this occurs, the effectiveness of the bactericide diminishes with continuing use, until finally it loses its effective bacteria-killing power.

Metronidazole (2-methyl-5-nitroimidazole-1-ethanol) has the following formula

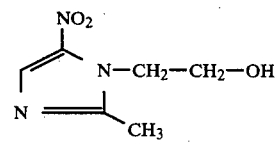

and is a well recognized antiprotozoal agent (The Merck Index 9th Edition, page 803).

It has been found that metronidazole is active against *D. Sulfuricans* at concentrations of about 0.1 to 500 PPM, and a preferred concentration for flood waters is about 0.1 to 10 PPM with about 1 mg/ml (1 PPM) being useful for most oil field flooding operations.

Typically, a water concentrate containing metronidazole is continually added to water to be pumped into a subterranean oil-bearing formation at such a rate that a concentration of 0.1 to 10 PPM of metronidazole is maintained. Conventional equipment is suitable for purposes of the present invention. Those skilled in the art will recognize that the concentration of bactericide will have to be adjusted to particular field situations. Thus, the term "effective amount of metronidazole" refers to concentrations in the range of 0.1 to 500 PPM and varies within that range from one field situation to another.

The art of treating flood waters in secondary and tertiary oil recovery with bactericidal agents is extensive and a host of agents have been used. For example,

| U.S. Pat. Nos.: | 3,111,492 | 2,979,456 | 3,592,918 |
| --- | --- | --- | --- |
| | 3,054,749 | 3,054,748 | Chem Abs 44 6055g |
| | 2,976,236 | 2,839,467 | Chem Abs 44 6110f |
| | 3,529,666 | 3,329,610 | |
| | 3,001,934 | 3,087,891 | | disclose agents and methods of adding a variety of bactericidal agents to secondary flooding waters. Thus, the present invention represents an improvement in well established technology, that improvement being the use of an effective amount of metronidazole in flooding waters or at least 0.1 parts per million of metronidazole in the flooding water.

The following examples are set forth to illustrate the present invention and should not be construed to limit the invention in spirit or scope.

EXAMPLE 1

The effectiveness of metronidazole in preventing the growth of the anaerobic bacterium, *Desulfovibrio desulfuricans*, the major cause of clogging in subterranean oil-bearing strata is demonstrated by following the procedure outlined in the publication of the American Petroleum Institute entitled "API Recommended Practice for Biological Analysis of Subsurface Injection Waters" (API RP 38, Second Edition, December 1965).

As described in the procedure for the Bacteriostatic Test-Sulfate Reducing Bacteria (page 5) a microbiological medium of the following composition is prepared.

| | |
|---|---|
| Sodium lactate, USP, milliliters | 4.0 |
| Yeast extract, grams | 1.0 |
| Ascorbic acid, grams | 0.1 |
| $MgSO_4.7H_2O$, grams | 0.2 |
| $K_2HPO_4$ (anhydrous), grams | 0.01 |
| $Fe(SO_4)_2(NH_4)_2.6H_2O$, grams | 0.2 |
| NaCl, grams | 10.0 |
| Distilled water, milliliters | 1000.0 |

The above ingredients, with the exception of the eron salt, are dissolved in the distilled water with gentle heating and stirring. After solution is complete the pH of the medium is adjusted to 7.3 with NaOH and the medium is sterilized by heating in an autoclave at 120° C. for 10 minutes. After sterilization the medium is allowed to cool slightly and the iron salt is added. The pH is checked and readjusted if necessary. The medium is then cooled to room temperature without agitation. When cool, the medium is inoculated with an actively growing culture of *Desulfovibrio desulfuricans,* Mid Continent Strain A. This strain has been designated by the American Petroleum Institute as the test culture of sulfate reducing bacteria for comparative screening of antibacterial chemicals.

A series of descending concentrations of metronidazole in distilled water is prepared and aliquots of these solutions are added to sterile vials. The vials are filled to capacity with the inoculated medium and are sealed with sterile rubber lined aluminum caps. The vials are incubated at a suitable temperature and are examined for growth of the test organism as evidenced by the development of turbidity or blackening of the medium over a period of up to 28 days. Under these circumstances metronidazole prevents growth of *Desulfovibrio desulfuricans* at concentrations in the range of from 0.1 to 1.0 part per million.

EXAMPLE 2

In a water treatment plant, a water concentrate containing metronidazole is continually added to water to be pumped into subterranean oil-bearing formation at such a rate that the concentration of metronidazole is between 0.1 to 10 PPM. This effectively controls bacterial plugging of the oil-bearing sands and the piping system utilized in the water flooding operations.

I claim

1. In a process of oil recovery characterized by the steps of injecting flooding water into oil-bearing subterranean formations to displace portions of the residual oil therein the improvement comprising using flooding water containing an effective antibacterial amount of metronidazole.

2. A process according to claim 1 wherein the flooding water contains 0.1 to 500 PPM metronidazole.

3. A process according to claim 1 wherein the flooding water contains 0.1 to 10 PPM metronidazole.

4. A process according to claim 1 wherein the flooding water contains at least 0.1 PPM metronidazole.

5. A method for controlling bacterial growth during oil recovery operations comprising contacting the bacterial growth present during oil recovery operations with a 0.1 to 500 PPM metronidazole solution.

* * * * *